United States Patent
Price et al.

[19]

[11] Patent Number: 6,000,661
[45] Date of Patent: Dec. 14, 1999

[54] AUTONOMOUS SPACECRAFT PAYLOAD BASE MOTION ESTIMATION AND CORRECTION

[75] Inventors: Xen Price, Menlo Park; Kam Chan, San Jose; Jeffery Stoen, Palo Alto, all of Calif.

[73] Assignee: Space Systems/Loral, Inc., Palo Alto, Calif.

[21] Appl. No.: 08/935,044

[22] Filed: Sep. 22, 1997

Related U.S. Application Data

[60] Provisional application No. 60/028,870, Oct. 16, 1996.

[51] Int. Cl.$^6$ .............................. B64G 1/24; B64G 1/38; B64G 1/36
[52] U.S. Cl. ........................ 244/164; 244/170; 244/171; 701/13
[58] Field of Search .................................... 244/164, 165, 244/170, 171; 701/13

[56] References Cited

U.S. PATENT DOCUMENTS

| | | |
|---|---|---|
| 3,834,653 | 9/1974 | Perkel ..................................... 701/13 X |
| 4,084,772 | 4/1978 | Muhlfelder . |
| 4,084,773 | 4/1978 | Schmidt, Jr. et al. ................. 701/13 X |
| 4,437,047 | 3/1984 | Smay ................................... 244/164 X |
| 4,489,383 | 12/1984 | Schmidt, Jr. . |
| 4,521,855 | 6/1985 | Lehner et al. . |
| 4,599,697 | 7/1986 | Chan et al. . |
| 4,684,084 | 8/1987 | Fuldner et al. . |
| 4,687,161 | 8/1987 | Plescia et al. ....................... 244/164 X |
| 4,725,024 | 2/1988 | Vorlicek . |
| 4,752,884 | 6/1988 | Slafer et al. .............................. 701/13 |
| 4,758,957 | 7/1988 | Hubert et al. . |
| 4,759,517 | 7/1988 | Clark . |
| 4,767,084 | 8/1988 | Chan et al. ............................. 244/164 |
| 4,848,706 | 7/1989 | Garg et al. . |
| 4,931,942 | 6/1990 | Garg et al. . |
| 5,109,346 | 4/1992 | Wertz . |
| 5,139,218 | 8/1992 | Bird et al. .............................. 244/165 |
| 5,184,790 | 2/1993 | Fowell .................................... 244/165 |
| 5,222,023 | 6/1993 | Liu et al. . |
| 5,349,532 | 9/1994 | Tilley et al. . |
| 5,400,252 | 3/1995 | Kazimi et al. . |
| 5,452,869 | 9/1995 | Basuthakur et al. . |
| 5,459,669 | 10/1995 | Adsit et al. . |
| 5,587,714 | 12/1996 | Chu et al. . |
| 5,655,735 | 8/1997 | Wirthman et al. . |
| 5,751,078 | 5/1998 | Loewenthal ........................ 244/165 X |

FOREIGN PATENT DOCUMENTS 0 499 815 A1   8/1992   European Pat. Off. .

OTHER PUBLICATIONS

"Quaternion Feedback for Spacecraft Large Angle Maneuvers", Bong Wie et al., J. Guidance, vol. 8 No. 3, May, Jun. 1985, pp. 360–365.

"Attitude Stabilization of Flexible Spacecraft During Stationkeeping Maneuvers", Bong Wie et al., J. Guidance, vol. 7, No. 4, pp. 430–436, Jul.–Aug. 1984.

*Primary Examiner*—Theresa M. Wesson
*Attorney, Agent, or Firm*—Perman & Green, LLP

[57] ABSTRACT

A feedback motion compensation (FMC) component for use in a spacecraft having a payload. The FMC component includes a controller having sensor data inputs and an open loop dynamics model that is driven by actuator commands to produce a high accuracy attitude estimate suitable for payload motion compensation.

16 Claims, 8 Drawing Sheets

FIG. 1

FIG. 2 hzc IS THE WHEEL TORQUE COMMAND FROM THE LOG CONTROLLER
hym IS THE PITCH MOMENTUM MEASURED BY THE TACHOMETER

AUTONOMOUS SPACECRAFT PAYLOAD BASE MOTION ESTIMATION AND CORRECTION

CLAIM OF PRIORITY FROM A PROVISIONAL PATENT APPLICATION

Priority is herewith claimed under 35 U.S.C. §119(e) from Provisional Patent Application Ser. No. 60/028,870, filed Oct. 16, 1996, now abandoned, entitled "Autonomous Spacecraft Payload Base Motion Estimation and Correction" by Xen Price, Kam Chan, and Jeffery Stoen. The disclosure of this Provisional Patent Application is incorporated by reference herein in its entirety.

FIELD OF THE INVENTION

This invention relates generally to spacecraft and, in particular, to methods and apparatus for maintaining a spacecraft payload in a desired pointing direction.

BACKGROUND OF THE INVENTION

Spacecraft, such as geosynchronously orbiting three axis stabilized satellites, typically carry some type of payload, such as an Earth imaging camera and related equipment. The related equipment can include a stabilized gimbal system for pointing the camera relative to the body of the spacecraft. Satellites intended for meteorological purposes are one well known example.

It can be appreciated that it is important to maintain the payload in a desired pointing direction with respect to the Earth, and to thus compensate for movements of the satellite away from a desired orbital configuration.

Although the satellite typically contains a closed loop control system to maintain the satellite's orbital attitude within predetermined limits, such control systems typically operate with a fast time constant. That is, a deviation from the satellite's desired attitude as sensed by, for example, one or more of Earth sensors, star sensors, solar sensors, gyroscopes, etc., is quickly corrected by energizing a spacecraft actuator, such as a thruster. However, the speed of the control Loop implies a higher noise level, relative to a control loop that has a longer intrinsic delay and slower time constant. As such, the presence of the higher noise level makes the spacecraft's attitude control system less than desirable for use in controlling the attitude of the payload, especially if the payload is required to obtain accurately registered images of the Earth or some other object.

OBJECTS OF THE INVENTION

It is an object of this invention to overcome the foregoing and other problems.

It is a further object of this invention to provide a further control loop, that operates in parallel with the spacecraft attitude control loop, for accurately compensating for payload motion.

SUMMARY OF THE INVENTION

This invention is directed to a method and apparatus to provide autonomous estimation and correction of payload base motion, and further provides improved payload pointing in the presence of unknown and/or non-repeatable base motion disturbances.

This invention provides a real-time payload base motion estimator, referred to herein also as a feedback motion compensation (FMC) component, that does not require additional payload base sensing, and that does not require that additional sensors be provided. In a presently preferred embodiment the teaching of this invention is implemented upon a three axis stabilized spacecraft, and employs payload motion estimation using only inputs from a standard spacecraft attitude control system, an attitude sensor, such as an Earth sensor, and momentum wheel commands. The FMC component in accordance with this invention combines the use of sensor data and an open loop dynamics model driven by actuator commands from the controller to produce a high accuracy attitude estimate suitable for payload motion compensation.

Advantages of this invention include improved payload pointing, an ability to correct for rapid base motion pointing errors, an ability to correct for non-repeatable disturbances, and an elimination of payload sensing requirements.

In accordance with a method of this invention to provide payload base motion compensation in a spacecraft, the following steps are executed: (a) providing a feedback motion compensation (FMC) component comprised of an open loop spacecraft dynamics model; (b) inputting sensor data and actuator commands to the FMC component; and (c) outputting roll, yaw and pitch estimations suitable for use in performing a payload base motion compensation. The sensor data is comprised of an output from an Earth sensor and an output from a pitch momentum tachometer, and the actuator command is comprised of a momentum wheel torque command.

In a preferred embodiment a payload roll and yaw estimation is made in accordance with a momentum wheel torque command and an Earth sensor roll error indication, and a payload pitch estimation is made in accordance with an output of a pitch momentum wheel tachometer and an Earth sensor pitch error indication.

In a preferred embodiment the payload roll and yaw estimation is implemented in accordance with a Linear Quadratic Gaussian (LQG) estimation process, and payload pitch estimation is made in accordance with a Kalman filtering process.

BRIEF DESCRIPTION OF THE DRAWINGS

The above set forth and other features of the invention are made more apparent in the ensuing Description of the Invention when read in conjunction with the attached Drawing, wherein.

DETAILED DESCRIPTION OF THE INVENTION

Figure 1:
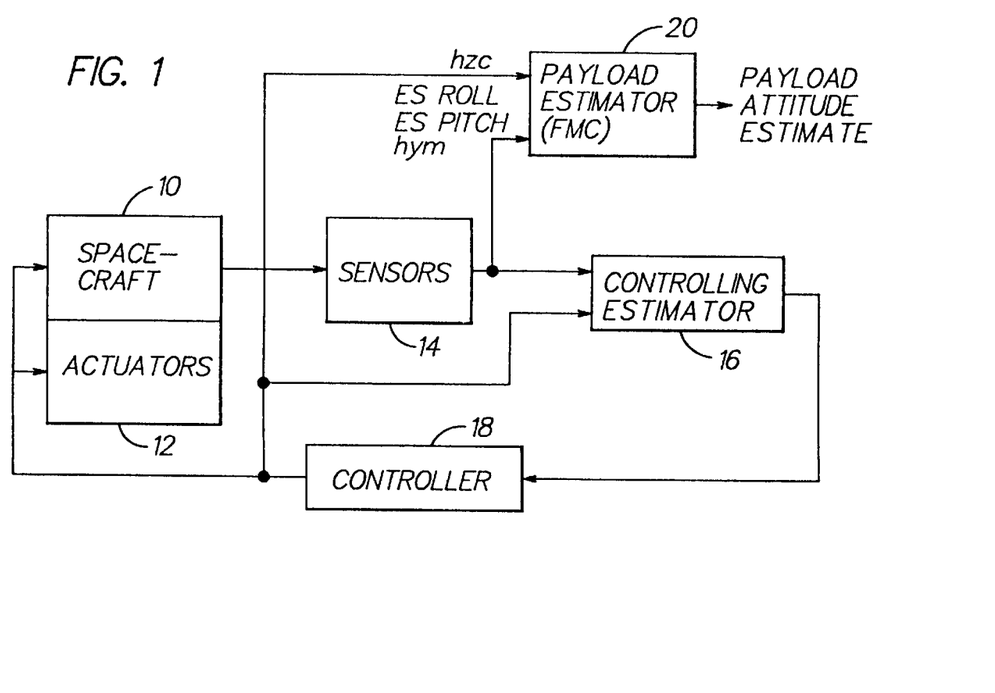
FIG. 1 is block diagram of a spacecraft having a payload motion estimator in accordance with this invention.

Referring to FIG. 1, this invention provides a real-time payload base motion estimator, referred to herein also as a feedback motion compensation (FMC) component 20, that does not require additional payload base sensing, and that does not require that additional sensors be provided. The invention is implemented upon a three axis stabilized spacecraft 10 having actuators 12, and employs payload motion estimation using only inputs from a standard spacecraft attitude control system 16 and 18, an Earth sensor 10C' that forms a portion of a sensors block 14, and momentum wheel commands. The FMC component 20 in accordance with this invention combines the use of sensor data and an open loop spacecraft dynamics model that is driven by actuator commands from the controller 18 to produce a high accuracy attitude estimate suitable for payload motion compensation.

Figure 7A:
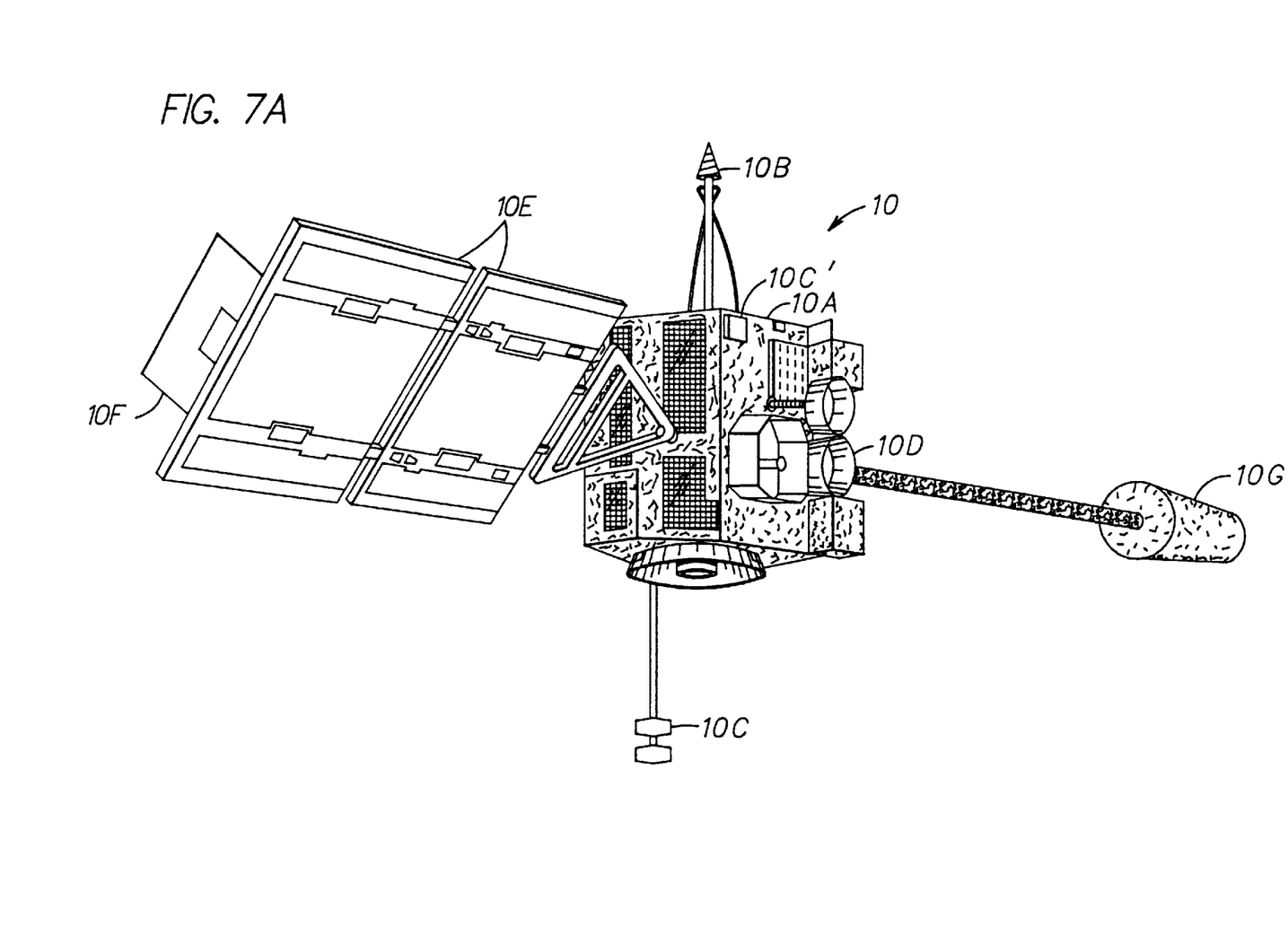
FIG. 7A is an elevational view of a spacecraft that is suitable for practicing this invention.
Figure 7B:
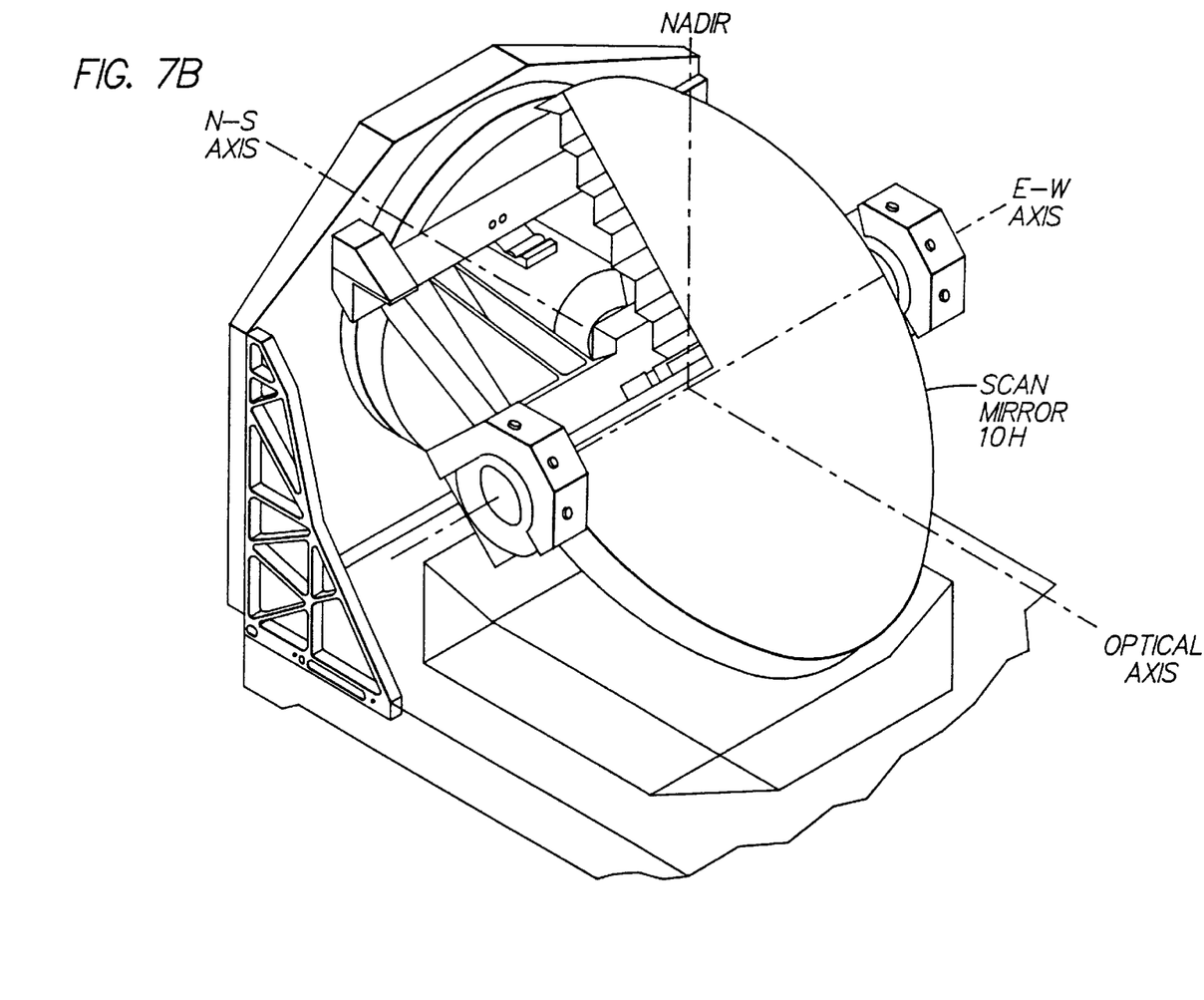
FIG. 7B is an elevational view of an imager scan assembly that forms a portion of the payload of the spacecraft of FIG. 7A.
Figure 7C:
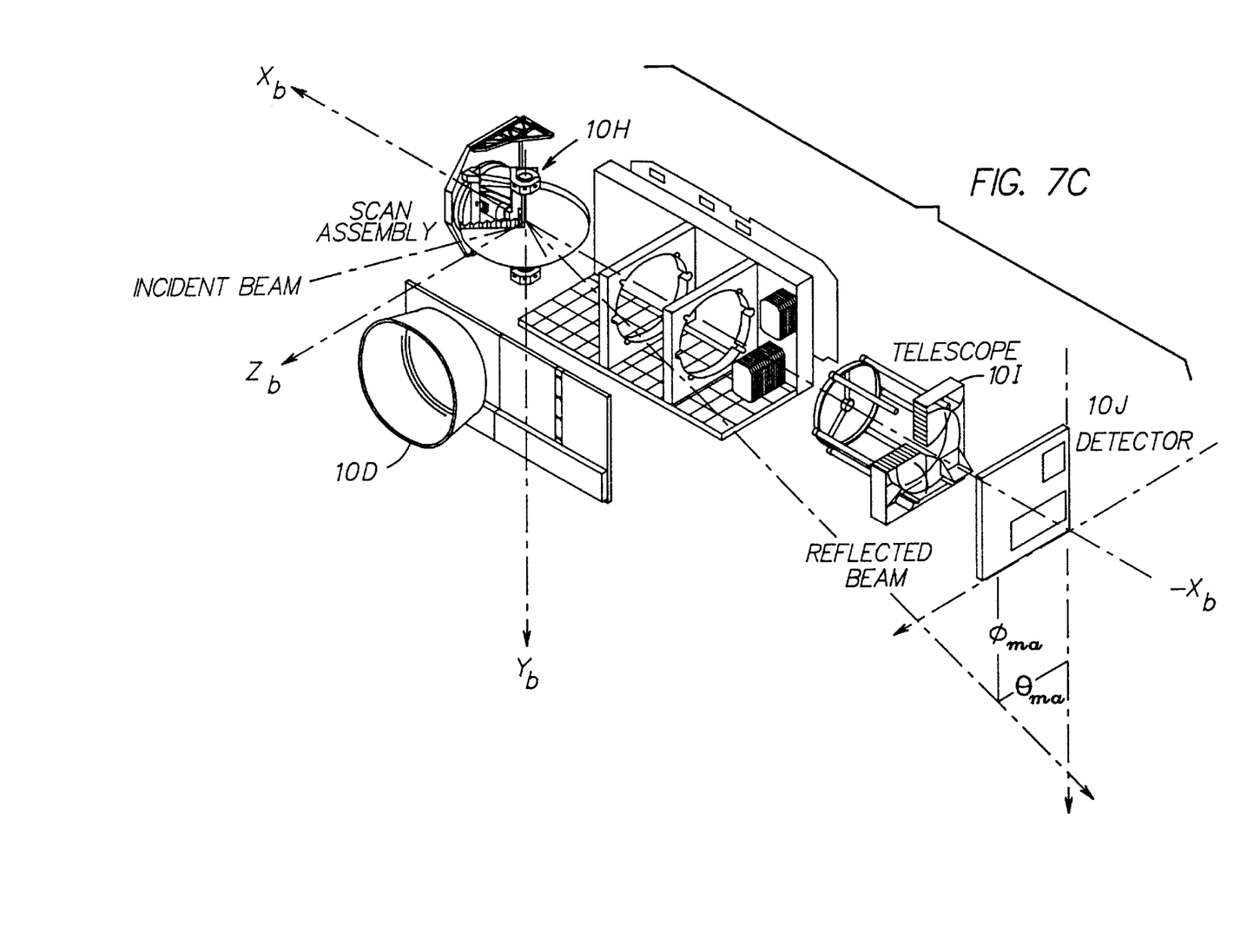
FIG. 7C is an elevational, exploded view of the imager payload that includes the imager scan assembly of FIG. 7B, and which further shows spacecraft and imager axes.
Figure 7D:
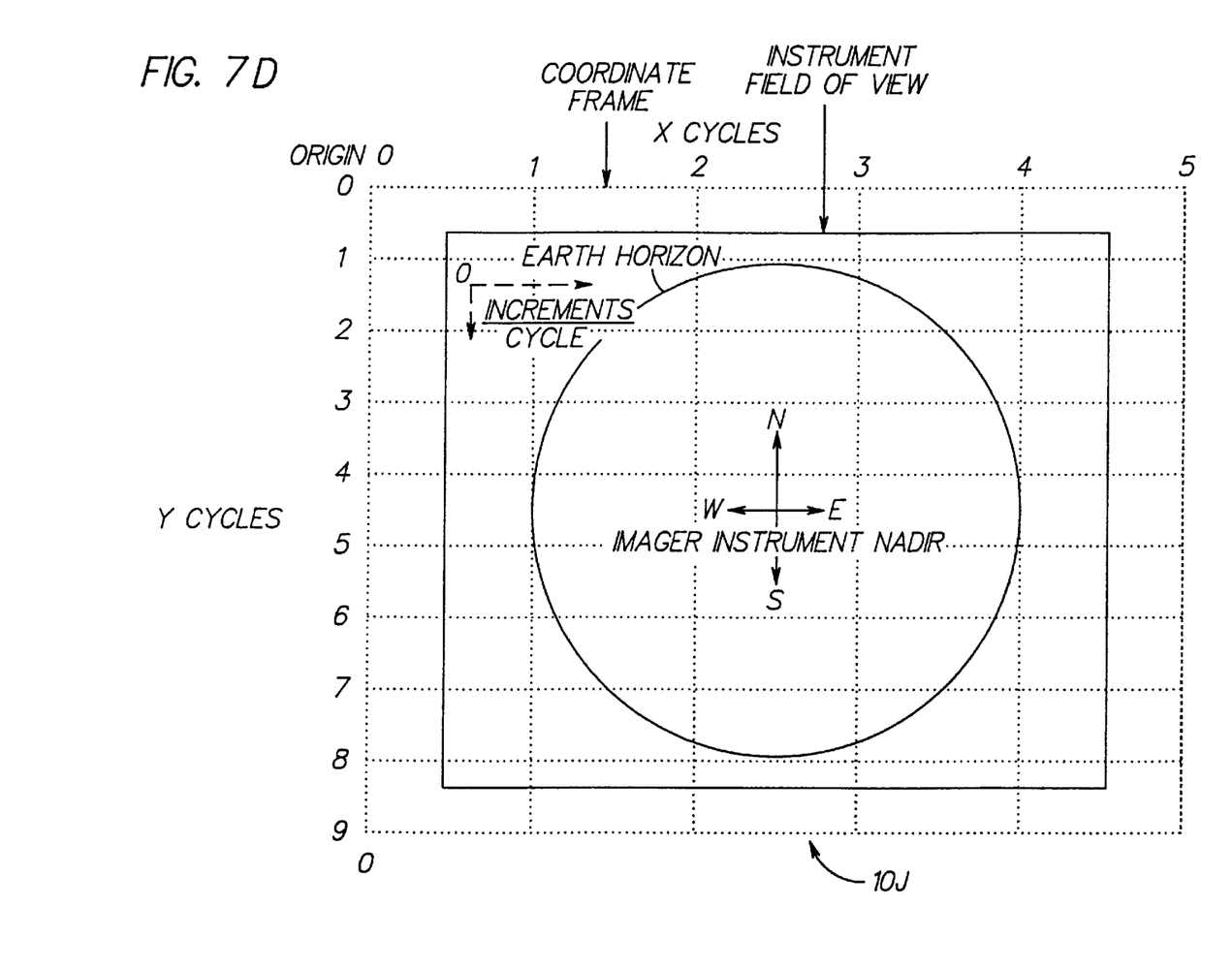
FIG. 7D illustrates the imager coordinate frame of the imager shown in FIG. 7C.

Reference is made to FIGS. 7A–7D for showing an exemplary embodiment of the spacecraft 10 in greater detail. The spacecraft 10 includes a bus 10A from which protrudes a telemetry and control (T&C) antenna 10B, a magnetometer 10C, the Earth sensor 10C', and an entrance aperture 10D of the imaging payload. Also attached to the bus 10A are solar panels 10E, which support a trim tab 10F, and a solar sail 10G. FIG. 7B shows a portion of the imaging payload, in particular a scan mirror 10H and its associated components. FIG. 7C illustrates the orientation of the scan mirror assembly and scan mirror 10H to the optical aperture 10D, as well as to a telescope 10I and detector 10J. The various spacecraft and imager axes are also shown. FIG. 7D illustrates the coordinate frame of the imager 10J, and shows an exemplary image of the earth overlaid on the imager.

Although described in the context of the use of an output from the Earth sensor 10C', it should be realized that other sensor outputs, such as a star sensor, solar sensor, gyroscope, etc., can also be employed. The sensor block 14 also includes a tachometer for measuring pitch wheel momentum.

The Feedback Motion Compensation (FMC) method and apparatus for use in the satellite 10 is now described in greater detail. It is first noted that FMC is one component of a Signal Motion Compensation (SMC) technique that is designed to compensate for spacecraft attitude disturbances by either applying an Earth sensor bias, or by modifying the North/South and East/West scan angles of the above described imager that forms a portion of the spacecraft payload. The FMC is one of three components of motion compensation that are used to modify the imager scan angles, the others being Mirror Motion Compensation (MMC) and Table Motion Compensation (TMC). Of interest to the teachings of this invention is the FMC component, and the MMC and TMC components are not further described.

The FMC component 20 uses filtered Earth sensor 10C' and pitch momentum tachometer information to estimate the roll, pitch, and yaw attitude variations caused by a variety of disturbances, such as entrance and exit from Earth Sensor (ES) single chord operation, thermal snap, and ES glint, among others.

For roll and yaw estimation, the FMC 20 makes use of a full order Linear Quadratic Gaussian (LQG) estimator. This sixth order estimator, referred to in FIG. 2, estimates roll angle, roll rate, yaw angle, yaw rate, wheel yaw momentum, and the integral of roll using the Earth sensor (ES) 10' roll angle and the commanded wheel yaw momentum ($h_{zc}$) as inputs. The utility of the full order LQG estimator, designed for short-term spacecraft body roll/yaw control, is extended to FMC where a duplicate copy of the full order LQG estimator (or, equivalently, a second call to a full order LQG estimator subroutine) is used with revised gains that are specified for the FMC function. For pitch attitude estimation, a prediction is produced by filtering and integrating pitch momentum tachometer data and/or filtering the Earth sensor error. Similar to roll/yaw prediction, the pitch prediction is fed back to the imager payload to modify the scan angles of the camera.

The following provides a detailed description of the FMC technique. The description begins with the roll/yaw FMC estimator to define how it cooperates with the overall compensation scheme. This is done by highlighting the dependence of the FMC estimator on the controlling estimator states. This is followed with a description of the pitch prediction estimation. A simulation to demonstrate the performance of FMC during an event typical of what FMC is designed to handle, e.g., compensating for attitude disturbances during scan inhibit entrance and exit, is also provided.

Roll/Yaw FMC and Equations

Roll/Yaw FMC makes use of the same full order LQG estimation architecture as the spacecraft roll/yaw estimating controller 16, except that the gains are modified to yield lower bandwidth estimates of the attitude of the spacecraft 10. Operated in this manner the estimates provide increased Earth sensor noise rejection, somewhat at the expense of decreasing the ability to track the higher frequency disturbances. However, an advantage is realized in that the noise is reduced. The basis for adding a second estimator to the system follows from the fact that using the commanded yaw momentum as an input to the FMC estimator 20 ensures that the separation principle is preserved, allowing for design of the FMC estimator gains independent of the controller 18 and estimator 16 characteristic roots.

The FMC estimator state equations can be included as a 6×1 vector with appropriate additions to the state propagation matrix as follows, $$\begin{bmatrix} \dot{x} \\ \dot{\hat{x}} \\ \dot{\bar{x}} \end{bmatrix} = \begin{bmatrix} A & -BK_c & 0 \\ K_c C & A-BK_c-K_c C & 0 \\ K_{fmc} C & -BK_c & A-K_{fmc} C \end{bmatrix} \begin{bmatrix} x \\ \hat{x} \\ \bar{x} \end{bmatrix}.$$

Defining the error between the actual states and FMC estimator states as $$\tilde{x} = x - \bar{x}$$

then differentiating yields $$\dot{\tilde{x}} = \dot{x} - \dot{\bar{x}}.$$

Substituting from the matrix equation above $$\dot{\tilde{x}} = Ax - BK_c \hat{x} - K_{fmc} Cx + BK_c \hat{x} - A\bar{x} + K_{fmc} C\bar{x}$$

$$\dot{\tilde{x}} = A(x-\bar{x}) - K_{fmc} C(x-\bar{x})$$

$$\dot{\tilde{x}} = (A - K_{fmc} C)\tilde{x},$$

which shows that the FMC error equation is completely separable from the plant and control estimator dynamics, which allows for arbitrary placement of the FMC poles, $\lambda_{fmc}$, according to the equation $\lambda_{fmc} = \det[s1-(A-(K_c)_{fmc}C)]$.

This enables one to choose the estimator poles specifically for rejecting Earth sensor 14 noise at the expense of bandwidth, if so desired. Propagation of the FMC estimator states according to the last row sub-block of the above matrix equation can be done by making a second call to the subroutine used for the spacecraft body estimation. It should be noted that, as indicated in the matrix equation above, the quantity $$h_{zc} = -BK_c\dot{x}$$

is fed back to the FMC estimator states. With reference to a subroutine call, this is accomplished by passing to the subroutine a quantity which contains the actual commanded hzc wheel torque command from the controller 18.

Roll/Yaw Controller Block Diagram

Figure 2:
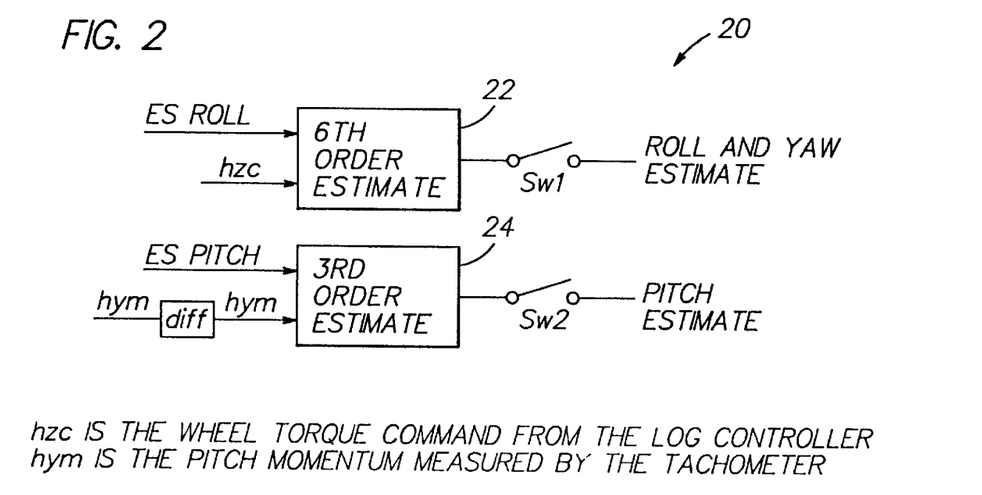
FIG. 2 is a block diagram that illustrates the payload motion estimator in greater detail.

The block diagram of FIG. 2 is a simplified depiction of the FMC estimator 20, and shows a 6th order roll/yaw estimator 22 and 3rd order pitch estimator 24. The outputs of each can be selectively decoupled by switches SW1 and SW2, respectively, from providing FMC attitude estimates to the payload. Referring also to FIG. 1, it can be seen that a common input to both the controlling estimator 16 and the FMC estimator 20, from the sensors block 14, is the roll attitude as measured by the Earth sensor 10C'. The commanded momentum wheel torque command is fed back to both the controlling estimator 16 and the FMC estimator 20 from the controller 18.

Roll/Yaw FMC Gain Table

The units field in the third column of the following table indicate the expected units for the input quantity in the denominator and resulting units for the output quantity in the numerator for each gain. For example, the gain $(K_e)_{fmc}(3)$ is used to construct the estimate of spacecraft 10 roll momentum in Nms given the measurement of the roll angle in radians. Hence, $(K_e)_{fmc}(3)$ multiplied by N, in radians produces the estimate $(H_x)_{est}$, in Nms.

operation, the L mode refers to operation with one momentum wheel and a reaction wheel (RW), referred to as the L1 mode when operating with M1 and the RW, or as the L2 mode when operating with M2 and the RW.

Pitch FMC Equations and Block Diagram

Figure 3:
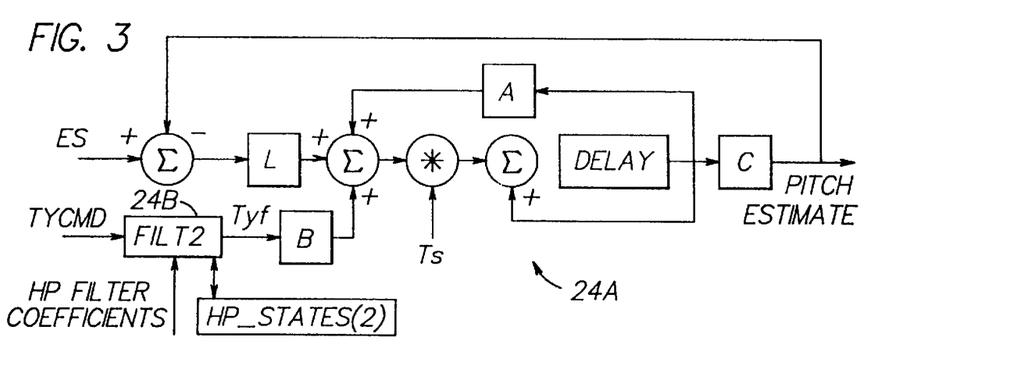
FIG. 3 is a block diagram of a pitch Feedback Motion Compensation (FMC) unit.

Having described FMC roll/yaw estimation, reference is now made to FIG. 3 for illustrating pitch estimation. The pitch FMC unit 24 makes use of a second order Kalman filter 24A to estimate pitch attitude. The Kalman filter 24A is driven by a high pass (HP) filtered commanded torque signal from the pitch momentum wheel control system. The Kalman filter 24A update is defined by the following equation:

$$\dot{X} = AX + B\tau_n + L^*(ES - CX)$$

where $$X = \begin{bmatrix} \theta \\ \dot{\theta} \end{bmatrix} \quad A = \begin{bmatrix} 0 & 1 \\ 0 & 0 \end{bmatrix} \quad B = \begin{bmatrix} 0 \\ \frac{1}{I_y} \end{bmatrix} \quad C = [1 \ 0]$$

The Kalman gain, L, is defined as a function of the solution to the following algebraic Ricatti equation.

$$\begin{bmatrix} 0 & 0 \\ 0 & 0 \end{bmatrix} = AP_{SS} + P_{SS}A^T + BR_\tau B^T - P_{SS}C^T R_{es}^{-1} CP_{SS}$$

$$L = P_{SS}C^T * R_{es}^{-1} = \begin{bmatrix} L_1 \\ L_2 \end{bmatrix}$$

Res and Rτ are the covariance of the earth sensor noise and pitch disturbance torque, respectively. A general optimal Kalman gain is given by

TABLE 1

FMC Estimator Gains

| Gain | Quantity | Units | V-Mode High | V-Mode Low | L-Mode High |
|---|---|---|---|---|---|
| $(K_e)_{fmc}(1)$ | $\phi_{est}$ | rad/rad | 0.02357 | 6.5722e-04 | 0.02076 |
| $(K_e)_{fmc}(2)$ | $\Psi_{est}$ | rad/rad | −0.03301 | −2.5670e-05 | −0.03480 |
| $(K_e)_{fmc}(3)$ | $(H_x)_{est}$ | Nms/rad | 2.100 | 1.6336e-03 | 1.635 |
| $(K_e)_{fmc}(4)$ | $(H_x)_{est}$ | Nms/rad | 1.304 | 4.1756e-02 | 0.8297 |
| $(K_e)_{fmc}(5)$ | $(h_x)_{est}$ | Nms/rad | 1.953 | 5.4390e-05 | 0.1454 |
| $(K_e)_{fmc}(6)$ | $\int \phi_{est}$ | (rad/sec)/rad | 1.0 | 1.0 | 1.0 |

The above selectable gain sets follow the conventions set for the controlling estimator 16. High gains are commanded for housekeeping purposes, while low gains are commanded during imaging periods. Transitioning between gain sets requires the same switching and feed forward logic for the FMC estimator 20 as for the controlling estimator 16. That is, the magnitude of the momentum change for momentum unloads is fed forward to the FMC estimator 20 as well as to the controlling estimator 16. Also, upon exiting housekeeping periods, the state update of the FMC integral state is made analogous to what is done for the integral state of the controlling estimator 1E. The V mode refers to operation with both momentum wheels (M1 and M2), which is normal $$L_2 = \frac{1}{I_y * SNR}$$

$$L_2 = \sqrt{\frac{2}{I_y * SNR}} = \sqrt{2} * L_2$$

$$SNR = \sqrt{\frac{R_{es}}{R_\tau}}$$

Figure 5:
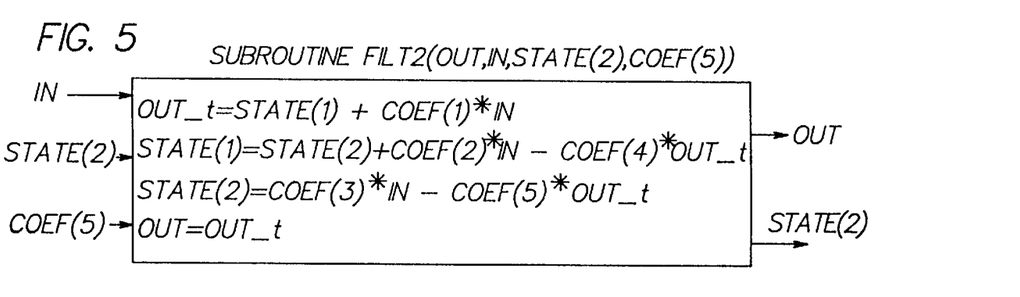
FIG. 5 illustrates a second order filter realization subroutine for the filter shown in FIG. 3.

The torque signal, Tyf is obtained by high pass filtering, in filter 24B, the commanded torque Tycmd generated by the pitch wheel control loop. The filter 24B, which is described below in greater detail and shown in FIG. 5, is employed to remove the effects of solar torque from the commanded torque signal. A second order digital Butterworth filter is used to ensure maximum roll off at low frequencies, and is realized with extended precision floating point arithmetic. The Kalman filter 24A is preferably realized using Euler Integration.

In FIG. 3 the input labeled ES is the Earth Sensor pitch error while the input Tyemd is the pitch torque command from the pitch wheel controller that forms a portion of the controller 18 of FIG. 1. Ts is the integration time step, while the matrices A, B, C, and L are defined in the foregoing equations.

Pitch FMC nominal flow diagram

Figure 4:
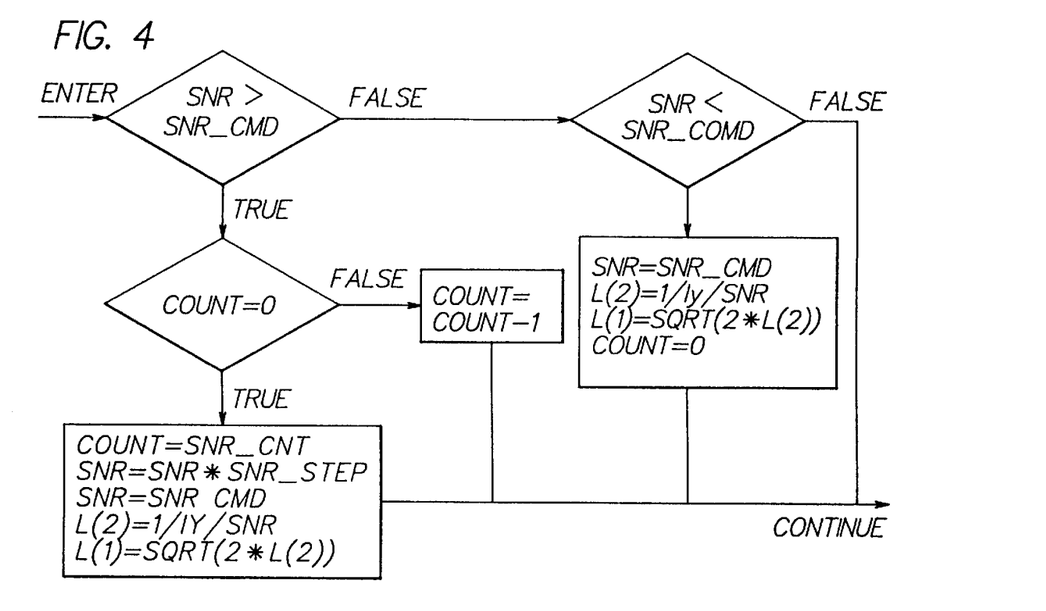
FIG. 4 is a logic flow diagram that illustrates the operation of the pitch FMC of FIG. 3, in particular pitch FMC gain slew logic.

Referring to FIG. 4, the pitch FMC gain slew logic is designed to allow maximum flexibility while preventing the occurrence of transients from gain switching. The variable, $SNR_{13}CMD$, is a gain that can be commanded from the ground, while SNR is a current gain that tracks $SNR_{13}CMD$. The analytic solution to the optimal estimator gain presented above allows a single physically meaningful gain variable to define a set of optimal gains. The gain slew automatically switches to high gain (low SNR) while it slews gradually to a low gain estimator (high SNR). The variables $SNR_{13}CNT$ and $SNR_{13}STEP$ define, respectively, the duration and step size of each individual gain step. These values are preferably memory uploadable from the ground, and may be represented as an integer.

FIG. 5 illustrates the operations of the subroutine filt2, depicted in FIG. 3 as the second order FILT2 block 24B. In order to obtain the necessary precision the calculations are preferably performed using extended precision. The states and the temporary output variable are extended precision, while the input, output, and filter coefficients can be 32-bit floating point numbers. The filter coefficients are preferably memory uploadable values.

Pitch FMC Gain Table

Pitch FMC has a number of gains associated with it that are defined in table 2. There is only one commendable gain, $SNR_{13}CMD$, that is changed routinely during imaging operations, and typical values are in the range of from 0.1 to 1000.

Figure 6A:
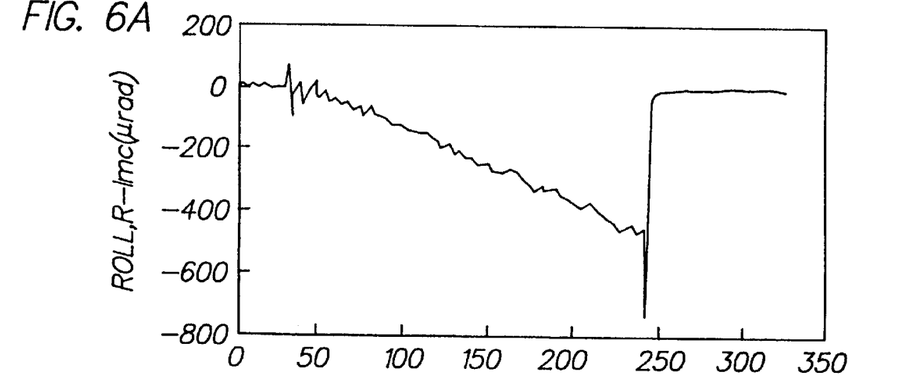
FIGS. 6A–6F are graphs illustrating spacecraft motion compensation of Earth sensor (ES) scan inhibit effects.
Figure 6B:
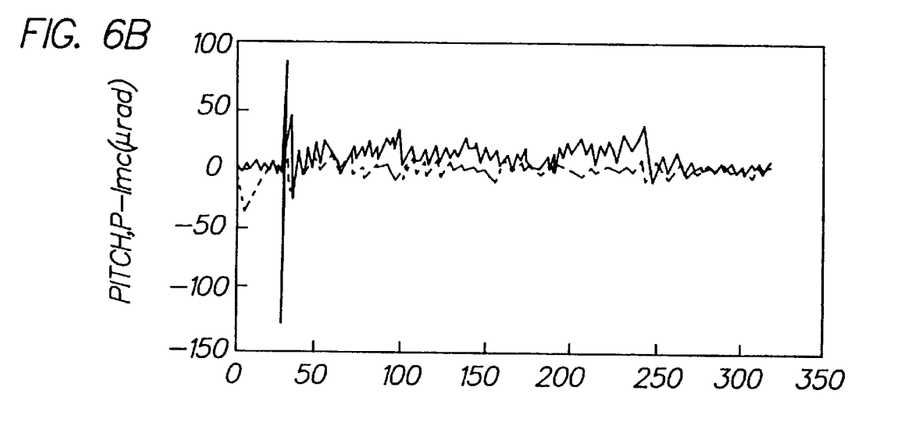
Figure 6C:
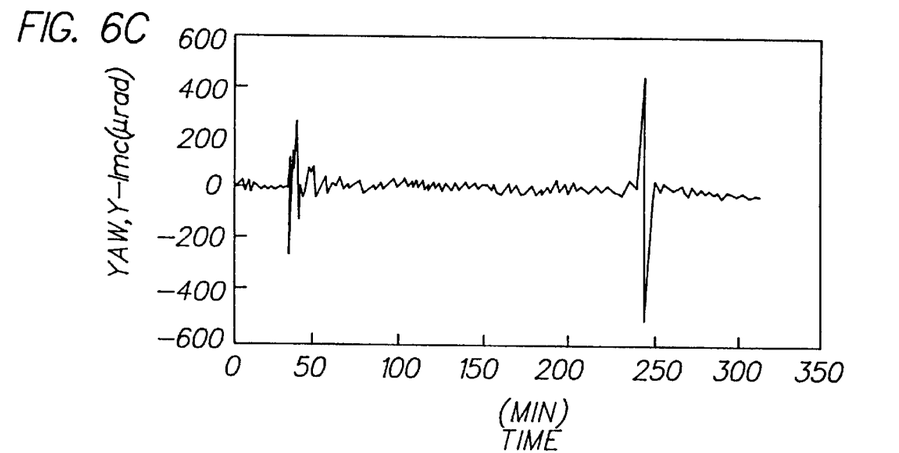
Figure 6D:
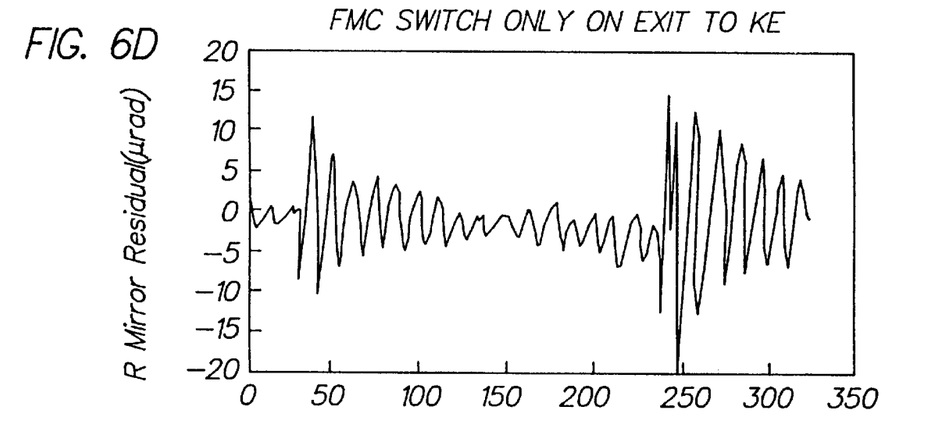
Figure 6E:
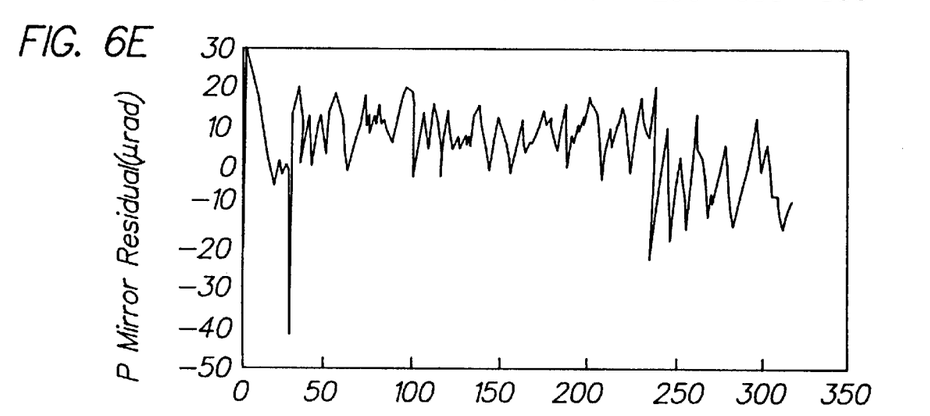
Figure 6F:
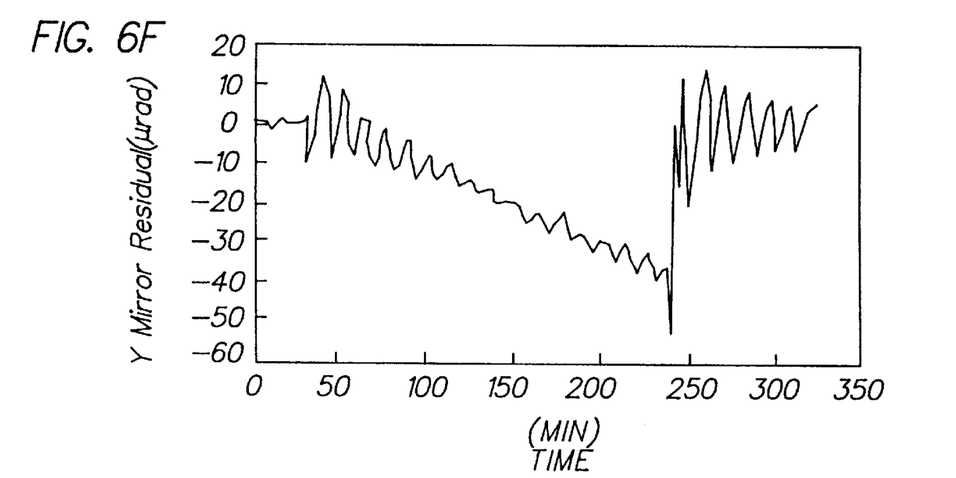

FIGS. 6A–6F show a result of a simulation of the FMC technique of this invention. FIGS. 6A–6C illustrate roll, pitch and yaw variations, respectively, over a period of about 320 minutes, while FIGS. 6D–6F illustrate corresponding imager scan mirror roll, pitch and yaw residuals, respectively, that result from the operation of the FMC component 20 of this invention.

While the invention has been particularly shown and described with respect to preferred embodiments thereof, it will be understood by those skilled in the art that changes in form and details may be made therein without departing from the scope and spirit of the invention.

What is claimed is:

1. A feedback motion compensation (FMC) component for use in a three axis body stabilized spacecraft having a payload, comprising a controller having sensor data inputs and including an open loop dynamics model driven by spacecraft actuator commands to produce a high accuracy attitude estimate of the spacecraft states for performing payload motion compensation where estimation errors comprised of the difference between the actual states and the estimated states are independent of spacecraft body control.

2. A FMC component as in claim 1, wherein said sensor data is comprised of an output from an Earth sensor.

3. A FMC component as in claim 1, wherein said sensor data is comprised of an output from a spacecraft wheel tachometer.

4. A FMC component as in claim 1, wherein said spacecraft actuator command is comprised of a wheel torque command.

5. A FMC component as in claim 1, wherein a payload roll and yaw estimation is made in accordance with a momentum wheel torque command and an Earth sensor roll error indication, and wherein a payload pitch estimation is made in accordance with an output of a pitch momentum wheel tachometer and an Earth sensor pitch error indication.

6. A method to provide payload base motion estimation in a three axis body stabilized spacecraft, comprising steps of:
   providing a feedback motion compensation (FMC) component comprised of an open loop spacecraft dynamics model;
   inputting spacecraft sensor data and actuator commands to the FMC component; and
   outputting roll, yaw and pitch estimations from the FMC component that are suitable for use in performing a payload base motion compensation where estimation errors comprised of the difference between the actual states and the estimated states are independent of spacecraft body control.

TABLE 2

Pitch FMC gain definitions

| Variable | Units | Definition | Value | CMD | Load |
|---|---|---|---|---|---|
| SNR_CMD | rad/Nm | CMD Estimator Gain | 5 | yes | no |
| SNR | rad/Nm | Current Estimator Gain | 5 | ind. | no |
| ly | NMSA2 | S/C pitch Intertia | 2438.0 | no | no |
| L1 | none | Kalman Position Gain | see table 1 | ind. | no |
| L5 | 1/sec | Kalman Rate Gain | see table 1 | ind. | no |
| SNR_STEP | none | SNR slew step size | 1.10 | no | no |
| SNR_CNT | ACDS cycles | SNR slew step duration | 30 | no | no |
| HP_COEF(1) | none | 1'st HP filter coefficient | 0.9982244250 | no | yes |
| HP_COEF(2) | none | 2'nd HP filter coefficient | −1.996448850 | no | yes |
| HP_COEF(3) | none | 3'rd HP filter coefficient | 0.9982244250 | no | yes |
| HP_COEF(4) | none | 4'th HP filter coefficient | −1.996445697 | no | yes |
| HP_COEF(5) | none | 5'th HP filter coefficient | 0.9964520027 | no | yes |

7. A method as in claim 6, wherein said sensor data is comprised of an output from an Earth sensor.

8. A method as in claim 6, wherein said sensor data is comprised of an output from a spacecraft wheel tachometer.

9. A method as in claim 6, wherein said spacecraft actuator command is comprised of a wheel torque command.

10. A method as in claim 6, wherein the step of outputting includes a step of estimating the payload roll and yaw in accordance with a momentum wheel torque command and an Earth sensor roll error indication, and further includes a step of estimating the payload pitch in accordance with an output of a pitch momentum wheel tachometer and an Earth sensor pitch error indication.

11. A method as in claim 10, wherein said step of estimating payload roll and yaw comprises a step of using a Linear Quadratic Gaussian (LQG) estimation process.

12. A method as in claim 10, wherein said step of estimating payload pitch comprises a step of using a Kalman filtering process.

13. A three axis body stabilized spacecraft comprising a camera, means for pointing said camera, and attitude sensors providing signals to a spacecraft body attitude control system operating with first gains and having actuator command outputs coupled to actuators for pointing said spacecraft body to maintain the spacecraft's attitude within predetermined limits, said spacecraft further comprising a camera feedback motion compensation component comprising a controller operating with second gains and having inputs coupled to said spacecraft attitude sensors, and further comprising a dynamics model that is driven by said spacecraft actuator commands to generate an attitude estimate for pointing said camera where estimation errors comprised of the difference between the actual states and the estimated states are independent of spacecraft body control.

14. A spacecraft as in claim 13, wherein said controller, using said second gains, estimates camera roll and yaw in accordance with wheel commands and a roll sensor error indication, and estimates camera pitch in accordance with an output of a wheel tachometer and a pitch sensor error indication.

15. A spacecraft as in claim 13, wherein said second gains are selected to yield lower bandwidth estimates of camera attitude than estimates made by said spacecraft body attitude control system using said first gains.

16. A spacecraft as in claim 13, wherein said controller comprises a sixth order Linear Quadratic Gaussian (LQG) estimator for estimating camera roll and yaw attitude, and further comprises a second order Kalman filter for estimating camera pitch attitude.

* * * * *